United States Patent [19]

Corwon et al.

[11] Patent Number: 4,852,410
[45] Date of Patent: Aug. 1, 1989

[54] OMEGA-SHAPED, CORIOLIS-TYPE MASS FLOW RATE METER

[75] Inventors: Michael E. Corwon; Randy L. Oliver, both of Greenwood, S.C.

[73] Assignee: Schlumberger Industries, Inc., Atlanta, Ga.

[21] Appl. No.: 915,085

[22] Filed: Oct. 3, 1986

[51] Int. Cl.[4] ................................. G01F 1/84
[52] U.S. Cl. ................................. 73/861.38
[58] Field of Search .................... 73/861.37, 861.38

[56] References Cited

U.S. PATENT DOCUMENTS

| | | | |
|---|---|---|---|
| 2,865,201 | 12/1958 | Roth | 73/861.38 |
| 4,127,028 | 11/1978 | Cox et al. | 73/861.38 |
| 4,381,680 | 5/1983 | Shiota | 73/861.38 |
| 4,491,025 | 1/1985 | Smith et al. | 73/861.38 |
| 4,628,744 | 12/1986 | Lew | 73/861.38 |
| 4,660,421 | 4/1987 | Dahlin et al. | 73/861.38 |
| 4,691,578 | 9/1987 | Herzl | 73/861.38 |
| 4,756,198 | 7/1988 | Levien | 73/861.38 |

FOREIGN PATENT DOCUMENTS 0125622 10/1981 Japan .................... 73/861.38

OTHER PUBLICATIONS

Micro Motion Model D Mass Flow Meter-Instruction Manual 12/85 pp. 14 and 15.

Primary Examiner—Herbert Goldstein
Attorney, Agent, or Firm—Cooper & Dunham

[57] ABSTRACT

A Coriolis-type mass flow meter which uses two parallel, omega-shaped conduits and deduces mass flow rate from changes in the phase difference of signals from sensors at the outboard curved portions of the conduits which measure the relative positions of the conduits' sizes.

36 Claims, 6 Drawing Sheets

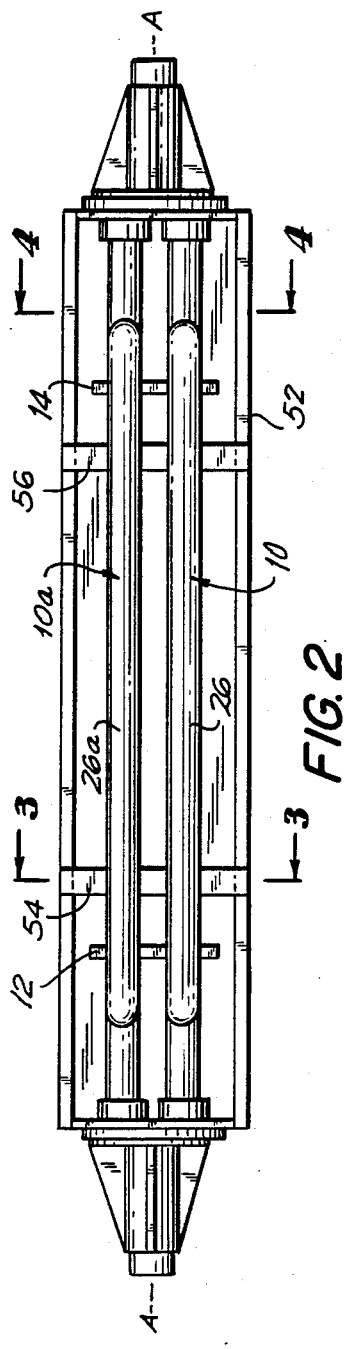
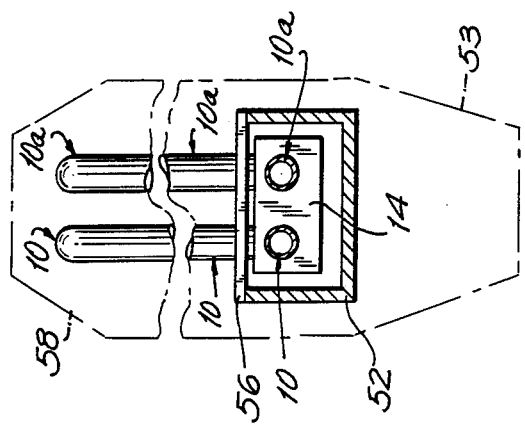
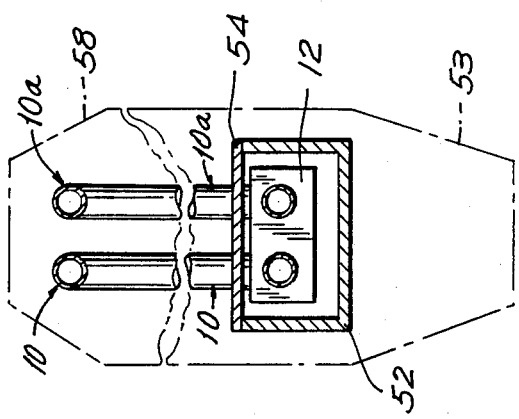

OMEGA-SHAPED, CORIOLIS-TYPE MASS FLOW RATE METER

BACKGROUND AND SUMMARY OF THE INVENTION

The invention is in the field of flow meters, more particularly mass flow meters of the Coriolis type.

Coriolis-type meters are based on the physical principle of conservation of angular momentum as it applies to the Coriolis acceleration of a fluid flowing through a conduit. For example, as illustrated in Sipin U.S. Pat. No. 3,485,098, when fluid flows through a bent tube which is mechanically oscillated about an axis passing through the inlet and outlet ends of the tube, Coriolis forces are generated causing the tube to twist about a response axis. Mass flow aate can be deduced from measuring the degree of this twist.

In Coriolis-type meters an electromagnetic oscillator can drive the tube about its oscillation axis at the system's resonant frequency, thereby producing a Coriolis acceleration and resulting force. The force acts perpendicular to the flow path and in alternate opposite directions as between the two legs of the tube, superimposing an oscillating moment about the response axis on the motion about the oscillation axis. The resulting moment, acting about the response axis and in a plane perpendicular to the driving moment, produces twisting at a deflection angle which is approximately proportional to the mass flow rate for a constant angular velocity. Control over variations in angular velocity can be attempted by a detection scheme which senses the deflection angle near the central position of the tube excursions, i.e. where the angular acceleration of the tube is near zero, at the point of constant angular velocity. The tube can be oscillated relative to a leaf spring of a similar mass, to make use of a convenient resonant frequency, or relative to a parallel tube carrying the same or shared fluid flow.

Various tube shapes have been proposed in the past. For example said Sipin U.S. Pat. No. 3,485,098 shows a tube having a U-shaped operative portion while Sipin U.S. Pat. No. 4,559,833 illustrates an S-shaped conduit. Smith U.S. Pat. No. Re. 31,450 illustrates a U-shaped tube supported at its inlet and outlet ends and oscillated relative to a leaf spring about an axis perpendicular the legs at the support points. In addition, said U.S. Pat. No. Re. 31,450 and Cox et al. U.S. Pat. No. 4,127,028 illustrate a tube shape which also is U-shaped but its legs are closer to each other at their inlet and outlet ends than at the curve of the U. Still in addition, said Cox et al. patent illustrates in FIGS. 4 and 5 a generally O-shaped tube having an inlet and an outlet which in FIG. 4 are approximately radial, and in FIG. 5 are approximately tangential (but in different planes). Two U-shaped, or generally U-shaped, tubes carrying the same or shared flow are illustrated in said Cox et al. patent and in Smith et al. U.S. Pat. No. 4,491,025.

Various techniques have been proposed for deducing mass flow rate from measurements of the effect of Coriolis forces on the tube or tubes. For example, said Sipin U.S. Pat. No. 3,485,098 discusses using strain gauges or magnetic vibration velocity sensors to derive electrical signals related to the motion of the vibrated tube, noting in connection with velocity sensors that their differential output is proportional to mass flow rate. Said Smith U.S. Pat. No. Re. 31,450 states that while there may be worthwhile information obtained by measurements as in said Sipin U.S. Pat. No. 3,485,098, velocity sensors require measurement of a minute differential velocity superimposed on the very large pipe oscillation velocity. U.S. Pat. No. Re. 31,450 therefore forsakes the use of velocity sensors in favor of optical sensors (photointerrupters) which have a flag (an opaque plate) affixed to the oscillated tube and a photocell and a light source affixed to a stationary frame such that the sensor would detect the passage of a tube leg through a plane fixed in space but would not detect any other aspect of the tube movement. The time lag between the respective passage of each leg of the tube through a respective plane fixed in space, is proposed as a measure of mass flow rate. A later Smith et al. U.S. Pat. No. 4,442,338 proposes the use of velocity sensors (despite the comments on such sensors in U.S. Pat. No. Re. 31,450) or strain gauges, or acceleration sensors. It proposes squaring the sinusoidal outputs of the velocity sensors to obtain the exact same square waves as in said earlier U.S. Pat. No. Re. 31,450, and deducing mass flow rate in the same manner.

Additional examples of material concerning mass flow meters can be found in Young, A. M., "Coriolis-Based Mass Flow Measurement," Sensors, Dec. 1985, Vol. 2 No. 12, pp. 6–10; "Mass Flow Meters," Measurements & Control, Sept. 1985, pp. 295–302; Spitzer, D. W., "Mass Flowmeters," Industrial Flow Measurement, IRP Student Text, Section 12, pp. 133–141; Hickl, E. L. et al., "Mass Flow Measurement In The 80's," , pp. 49–52; "Mass Flow Meters," Section 13, pp. 141–157; "Mass Flowmeter Accurate To±0.15%, " Chemical Engineering, Dec. 10, 1984; "Flowmeter Installs Directly In-Line With Process Piping," Chemical Processing, Mid-Nov. 1984, p. 82, DeCarlo, J. P., "Mass-Flow Measurement," Fundamentals Of Flow Measurement, 1984, Unit 11, pp. 203–220; Plache, K. O., "Coriolis/Gyroscopic Flow Meter," Mechanical Engineering, Mar. 1979, pp. 36–41.

It is believed that a substantial need still remains to suppress undesirable characteristics of the known Coriolis-type mass flow rate meters and enhance desirable characteristics, and this invention is directed to meeting that need.

In one exemplary embodiment, a mass flow rate meter in accordance with the invention uses a pair of generally Omega-shaped conduit, and deduces mass flow rate from changes in the phase difference of signals derived from velocity sensors responsive to relative motion between the sides of the two moving conduits.

A meter embodying this example of the invention brings about significant and surprising advantages in accuracy, ease of manufacture and use, and other desirable characteristics as compared with the known prior proposals, such as the use of U-shaped tube and time lag measurement of the passage of the sides of a U-shaped tube through planes fixed in space proposed in said U.S. Pat. Re. No. 31,450. For example, other things being equal, this example of the invention has a lesser dimension in the direction transverse to the general direction of the incoming and outgoing flow. This can be important in practice because a common application of Coriolis-type meters is in a continuous process, and plant pipe systems tend to be more cramped by parallel pipes in the general direction of process flow, but it is usually convenient to replace a section of pipe by a meter having the dimensions and configuration of an Omega-shaped meter. Another significant advantage is in the type of loading at the points where the inlet and outlet ends of each meter conduit are affixed to supports. Each meter conduit typically is welded to one or more fixed supports at its inlet and outlet ends. These welds can be a weak point. In the driving mode a U-shaped conduit stresses the joint weld in bending stress while an Omega-shape meter stresses it in torsion, which is less likely to cause joint failure. In the response mode, a U-shaped meter stresses the weld joints in torsion while an Omega-shaped meter stresses it in bending. However, in the response mode the bending stress on the weld joints of the Omega-shaped meter is lower because while in the U-shaped conduit the twisting of the curve of the U is transmitted directly to the weld joint by the straight or substantially straight legs, in an Omega-shaped meter it is transmitted through continuously and smoothly curved portions which themselves twist and thus substantially reduce the bending load at the weld joints. The response mode movement in the Omega-shaped meter is small as compared to the drive mode movement, making the bending stress less important. Additionally, the response/drive frequency ratio in an Omega-shaped meter embodying an example of the invention can be about 1.5, which is considerably lower than in a U-shaped
meter. Ratios in the range of about. 1.4 to about 1.6 are contemplated. This lower response/drive frequency ratio brings about the advantages: that there is more phase shift for a given mass flow rate and because twisting is easier about the torsional response axis. Still in addition, in an Omega-shaped meter the conduit is continuously and smoothly curved, to reduce flow resistance and disturbance. For example, the bend radius of a conduit in an Omega-shaped meter embodying an example of the invention preferably is about 2 to 3 times the outside diameter of the conduit, thus assuring low resistance to flow, and low pressure drop across the meter. In contrast, it is believed that other things being the same, the sharp inlet and outlet angles in a U-shaped tube cause more flow resistance and more pressure drop, and the long bend of the U also causes more pressure drop. In addition, it has been found that the shape of the conduit in an Omega-shaped meter inherently increases sensitivity as compared with known U-shape designs; this means that for a given level of sensitivity an Omega-shape meter can use larger diameter conduits, and thus can have less flow resistance and less pressure drop. The advantages of the Omega-shaped meter as opposed to prior proposals such as for an S-shaped meter include, among other things, (i) the fact that the inlet and outlet sections are coaxial, which is desirable when the meter is used in a facility where it is spliced in a straight pipe, and (ii) that an Omega-shape meter can much more effectively eliminate any adverse effect of gas bubbles which may form in a liquid flow, and of liquid (such as a condensate) which may form in a gas flow. The advantages over prior proposals such as the use of generally O-shaped tubes include the fact that if the inlet and outlet are approximately radial, as in FIG. 4 of said Cox et al. U.S. Pat. No. 4,127,028, the joint weld and flow resistance and disturbance problems are similar to those discussed in connection with U-shaped tubes, and if the inlet and outlet are approximately tangential, as in FIG. 5 of the same Cox et al. patent, the conduit is not planar and extraneous vibrational modes can be induced. Other significant and surprising advantages will become apparent from the detailed disclosure below of an exemplary Omega-shape meter.

In an exemplary embodiment of the invention, two generally Omega-shaped conduits share the flow. With liquid they typically are used upside down, i.e. the inlet and outlet sections are at the highest level, so that the conduits would not entrap gas. With gas they are right-side-up, i.e. the inlet and outlet are at the lowest level, so than liquid (such as condensate) can run out. When at rest, the two conduits conform to two substantially parallel vertical planes, and are aligned with each other. Each conduit comprises, in sequence along the fluid flow therethrough, (1) a substantially straight inlet section which has an inlet end secured to an inlet support, as by a welded joint, and extending therefrom and to the right (when viewed from direction normal to the parallel planes), (2) a first bent section which bends clockwise and ends up pointing to the left, (3) a first intermediate section which extends to the left, (4) a second bent section which bends counterclockwise and ends up pointing to the right, (5) a substantially straight middle section which extends to the right, (6) a third bent section which bends counterclockwise and ends up pointing to the left, (7) a second intermediate section which extends to the left, (8) a fourth bent section which bends clockwise and ends up pointing to the right, and (9) a substantially straight outlet section which extends to the right and terminates in an outlet end secured, as by a welded joint, to an outlet support. Braces affixed to the conduits (as by welding) inboard of their inlets and outlets, constrain their relative motion.

A driver alternately pushes apart and pulls together the centers of the middle sections of the conduits at a driving frequency which corresponds to the natural vibration frequency of the system, to thereby oscillate each conduit about a respective oscillation axis which is substantially concentric with that conduit's inlet and outlet sections. If there is no fluid flow through the conduits, their middle sections tend to remain substantially parallel despite their driving mode oscillation. If there is fluid flow through them, the Coriolis forces twist each conduit about a respective response axis which is perpendicular to its oscillation axis and its middle section, superimposing this twisting motion on the driving mode oscillation. The conduits twist about their respective response axis out of phase with each other, i.e. while their second bend sections (their left sides) move toward each other their third bent sections (their right sides) move away from each other, and while their second bent sections move away from each other their third bent sections move toward each other. Sensors at the second and third bent sections of the conduits produce sensor signals related to the relative movement of the second and third bent sections of the two conduits toward and away from each other. The parameter of interest is the change in phase difference between the sensor signal for the second bend and the sensor signal for the third bend. Mass flow rate is deduced from this change in phase difference.

BRIEF DESCRIPTION OF THE DRAWINGS

FIG. 2 is a top plan of a mass flow meter using Omega-shaped conduits, with the meter enclosure partly open and transducers omitted for clarity.

FIG. 3 is a section taken along lines 3—3 of FIG. 2.

FIG. 4 is a section taken along lines 4—4 of FIG. 2.

DETAILED DESCRIPTION

Figure 1:
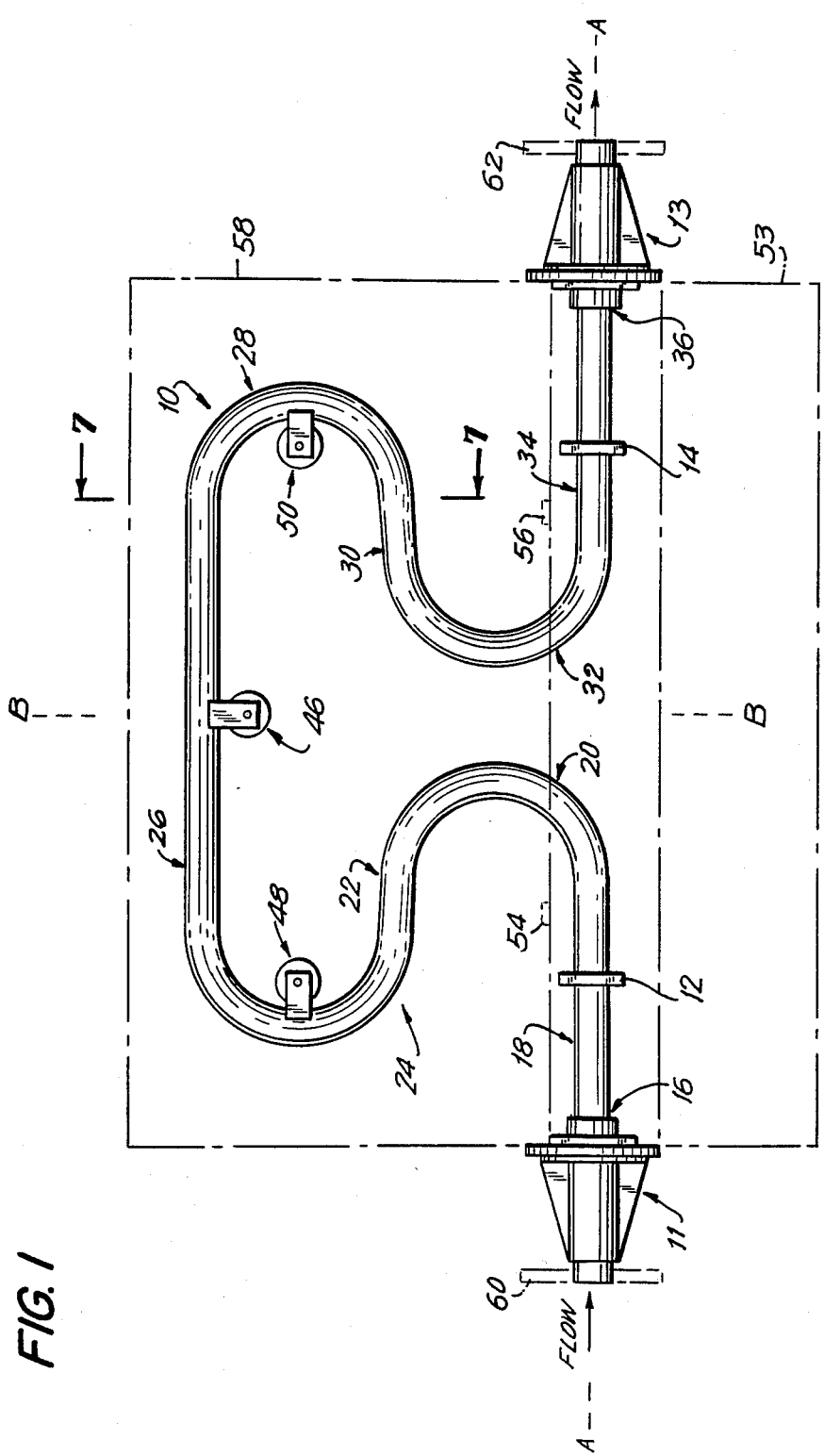
FIG. 1 is a side elevation of an Omega-shaped conduit and inlet and outlet manifolds, and of a schematic outline of a meter enclosure.

FIG. 1 illustrates a generally Omega-shaped conduit 10 which is a part of a mass flow rate meter embodying an example of the invention. The meter is in a position suitable for measuring the mass flow rate of a gas; to measure the mass flow rate of a liquid it would be upside-down from the illustrated position. Conduit 10 is affixed, as by weld joints, to an inlet manifold 11 at the left side in the view of FIG. 1, and to an outlet manifold 13 at the right side. The flow comes from the left and exits to the right in this example. As better seen in FIG. 2, there are two such conduits, 10 and 10a, which when at rest substantially conform to two planes which are parallel to each other and to the plane of FIG. 1 and are perpendicular to the plane of FIG. 2. The two conduits are substantially identical to each other; the parts of 10a which correspond to parts of 10 bear the same reference numeral but with the suffix "a." Conduits 10 and 10a are also affixed to an inlet brace 12 and an outlet brace 14, as by weld joints. Braces 12 and 14 are inboard of manifolds 11 and 13, and each can be a metal plate with openings for the conduits. Manifold 11 divides the incoming flow into a part going into conduit 10 and a substantially equal part going into conduit 10a, and manifold 13 combines the flow from conduit 10 and that from conduit 10a into a single outgoing flow leaving the meter. Each manifold can be a casting. Each conduit is continuous, made from a single piece of bent tubing, and curves continuously, to minimize flow resistance and disturbance.

In use of the meter, manifolds 11 and 13 typically are fixedly secured to respective supports, and act as supports for conduits 10 and 10a. These manifolds (supports) 11 and 13 face each other and are spaced from each other along an axis A'A' which, as discussed in greater detail below, is parallel to the respective oscillation axes AA about which the conduits are driven to oscillate at the system's natural frequency of vibration. The conduits thus are in the form of restrained beams extending between these supports (manifolds) 11 and 13. Braces 12 and 14, which are inboard from supports 11 and 13, also face each other and are spaced from each other along the oscillation axis AA.

Figure 1A:
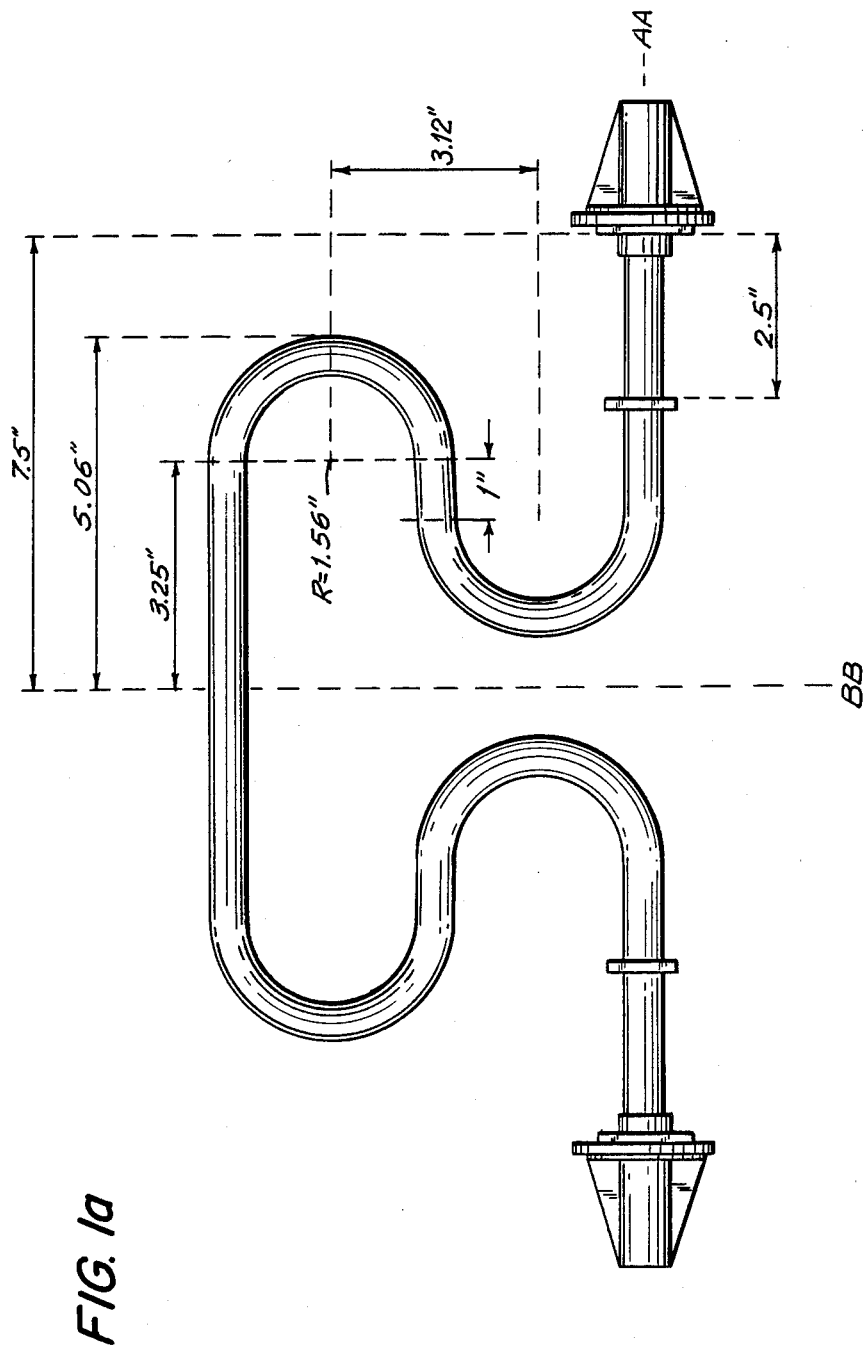
FIG. 1a shows the conduit of FIG. 1 with exemplary dimensions.

As best seen in FIG. 1, conduit 10 is generally Omega-shaped and comprises (1) an inlet end 16 affixed to inlet support (or manifold) 11, (2) a substantially straight inlet section 18 extending to the right (in the view of FIG. 1) from inlet end 16, (3) a first bent section 20 which bends about 180° counterclockwise and ends up pointing to the left, (4) a substantially straight, and relatively short, first intermediate section 22 which extends to the left, (5) a second bent section 24 which bends about 180° clockwise and ends up pointing to the right, (6) a substantially straight, and relatively long, middle section 26 which extends to the right, (7) a third bent section 28 which bends about 180° clockwise and ends up pointing to the left, (8) a substantially straight, and relatively short, second intermediate section 30 which extends to the left, (9) a fourth bent section 32 which bends about 180° counterclockwise and ends up pointing to the right, (10) a substantially straight outlet section 34 which extends to the right, and (11) an outlet end 36, which is the termination of section 34 and is secured to outlet support (or manifold) 13. Fluid comes into the meter through an inlet flange 60 at the outboard end of manifold 11, and exits the meter through a flange 62 at the outboard end of manifold 13. Conduit 10a has corresponding portions, substantially identical to those of conduit 10. Exemplary dimensions for a 0.5 inch 0D conduit are illustrated in FIG. 1a. All bends are at a radius of 1.56 inch measured to the tube axis. Straight sections 30 and 32 are 1" each long. Straight section 26 is 10.12 inches long, and sections 18 and 34 are about 5.65 inches long each. Each conduit is symmetrical about its response axis BB. In this exemplary embodiment, the driving frequency is about 87 Hz. and the response frequency is about 128 Hz, giving a response/drive ratio of about 1.5.

An electromagnetic driver 46, of a type known in the art, alternately pushes apart and pulls together the central portions of the middle sections 26 and 26a of conduits 10 and 10a, at a driving frequency corresponding to the natural frequency of vibration of the system, to thereby oscillate each conduit about a respective oscillation axis AA which is substantially concentric with its inlet and outlet sections. Note that neither oscillation axis AA intersects its conduit at or near the points where it is affixed to supports 11 and 13, or to braces 12 and 14, and that neither oscillation axis is perpendicular to the inlet and outlet ends at or near the points where they are affixed to supports 11 and 13, or to braces 12 and 14. Note also that each oscillation axis AA is perpendicular to supports 11 and 13 and to braces 12 and 14; it is not parallel to any of them. As each conduit is in the form of a restrained beam supported at its ends at supports 11 and 13 and braced at 12 and 14, neither is a cantilevered conduit or a conduit in the form of a cantilevered beam.

If there is no fluid flow through conduits 10 and 10a, their middle sections 26 and 26a tend to remain parallel to each other while moving away from and toward each other in the course of the driving mode oscillation. However, if there is fluid flow through conduits 10 and 10a, the resulting Coriolis forces superimpose (on the driving mode oscillation of each) a twisting motion about the respective response axis BB. Each response axis BB is substantially perpendicular to its conduit's oscillation axis AA and substantially bisects its conduit's middle section 26 (or 26a). The relative motion of conduits 10 and 10a with respect to each other generates respective signals in sensors 48 and 50, which can be velocity sensors such as voice coils of the type known in the art.

Figure 5:
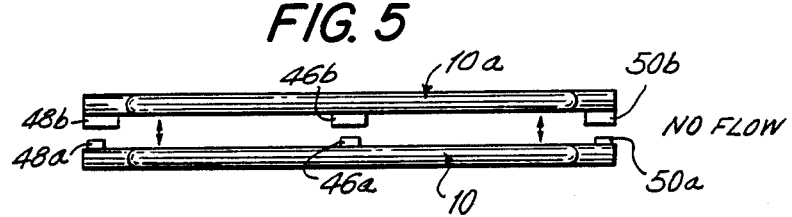
FIG. 5 is a top plan illustrating two Omega-shaped conduits oscillating with no fluid flow through them.

FIG. 5 illustrates conduits 10 and 10a moving in the driving mode when there is no fluid flow through them. As indicated, their middle sections remain substantially parallel to each other while moving toward and away from each other due to the forces generated by driver 46, which can comprise a magnet 46a affixed to the middle portion of conduit 10 and a coil 46b affixed at a matching position to the middle section of conduit 10b.

The coil can be energized with an AC signal corresponding to the system's natural vibration frequency as is known in the art.

Figure 6:
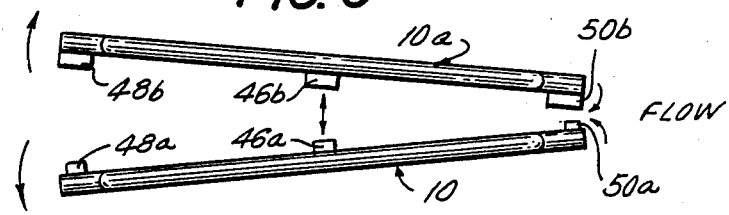
FIG. 6 is the same view but with fluid flow.
Figure 7:
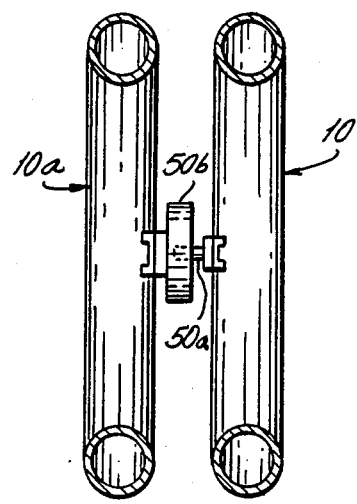
FIG. 7 is a section taken along lines 7—7 in FIG. 1, illustrating an exemplary transducer.

FIG. 6 illustrates conduits 10 and 10a undergoing a twisting motion (due to fluid flow through them) superimposed on their driving mode oscillation. As indicated, in a particular stage of their relative motion their left sides (second bent sections 24 and 24a) are moving away from each other while their right sides (third bent sections 28 and 28a) are moving toward each other. Sensor 48 generates a signal related to the relative motion of the left sides of the conduits, and sensor 50 generates a signal related to the relative motion of the right sides of the conduits. The maximum twist angle should occur when the distance between the centers of the two conduits is approximately as at rest. The twist due to Coriolis forces changes the rate at which the sides of the conduits (where the sensors are) come toward or move away from each other. As illustrated schematically in FIGS. 5 and 6, and in more detail in FIG. 7, each sensor can be a voice coil of a known type, comprising a magnet 50a affixed to conduit 10 and moving relative to coil 50b to induce therein a sensor signal related to the relative motion of the two conduits. The other sensor, 48, can be similar.

For a given conduit, in the driving mode the inlet and outlet sections 18 and 34 are loaded in torsion about the oscillation axis AA for that conduit in the same angular direction. As between the two conduits, their inlet and outlet sections are loaded in torsion in opposite angular directions about the respective oscillation axes AA. Because of the configuration described above, the cross product of the velocity of the fluid flowing in each of conduits 10 and 10a and the rotation of each conduit about its respective oscillation axis AA produce a Coriolis acceleration. This Coriolis acceleration multiplied by the mass of the fluid flowing through the conduits results in an alternating Coriolis force acting on each conduit. These Coriolis forces produce distortions which result in a difference in the relative velocities of the conduits at the second bent sections 24 and 24a and the third bent sections 28 and 28a. The fact that the Coriolis forces are generated in four sections of each of conduits 10 and 10a tends to produce a greater twist distortion than obtained in conduits where the Coriolis forces are generated in only two sections of a conduit. This increases the sensitivity of the meter and the accuracy of measurements.

For required strength, stiffness and stability, manifolds 11 and 13 are mounted fixedly to a tray 52 which is sufficiently rigid to keep extraneous loads from affecting conduits 10 and 10a. Braces 54 and 56 can be welded to tray 52 as shown in FIGS. 1-4 to stiffen it. Conduits 10 and 10a, and braces 12 and 14, do not contact tray 52. For protection and improved appearance, tray 52 and conduits 10 and 10a and braces 12 and 14 (and internal electronics such as discussed in connection with FIG. 8) are enclosed in a housing having a lower portion schematically illustrated at 53 in FIGS. 1, 3 and 4, and an upper portion 58 seen in the same FIGS. Housing portions 53 and 58 are fixedly secured to manifolds 11 and 13, and do not contact conduits 10 and 10a or tray 52. Flanges 60 and 62 at the outboard ends of supports (manifolds) 11 and 13 are used to splice the meter in a pipe (not shown) delivering the incoming flow and carrying away the outgoing flow as is known in the art. A suitably protected opening (not shown) can be provided in housing portion 53 (or 58) for electrical cables to electronics housed therein.

Figure 9:
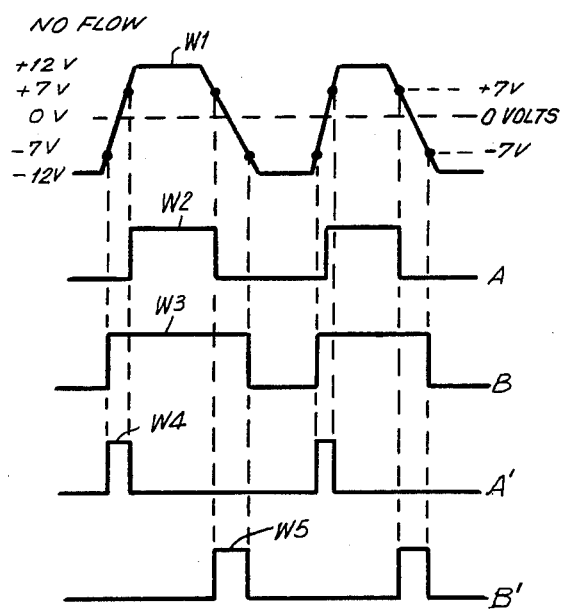
FIG. 9 is a timing diagram of signals present in the circuit of FIG. 8 when no fluid flows through the conduits.
Figure 10:
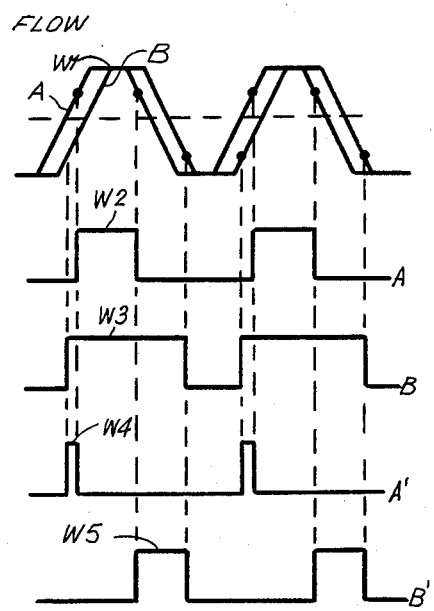
FIG. 10 is a timing diagram of signals present in the circuit of FIG. 8 when fluid flows through the conduits.
Figure 8:
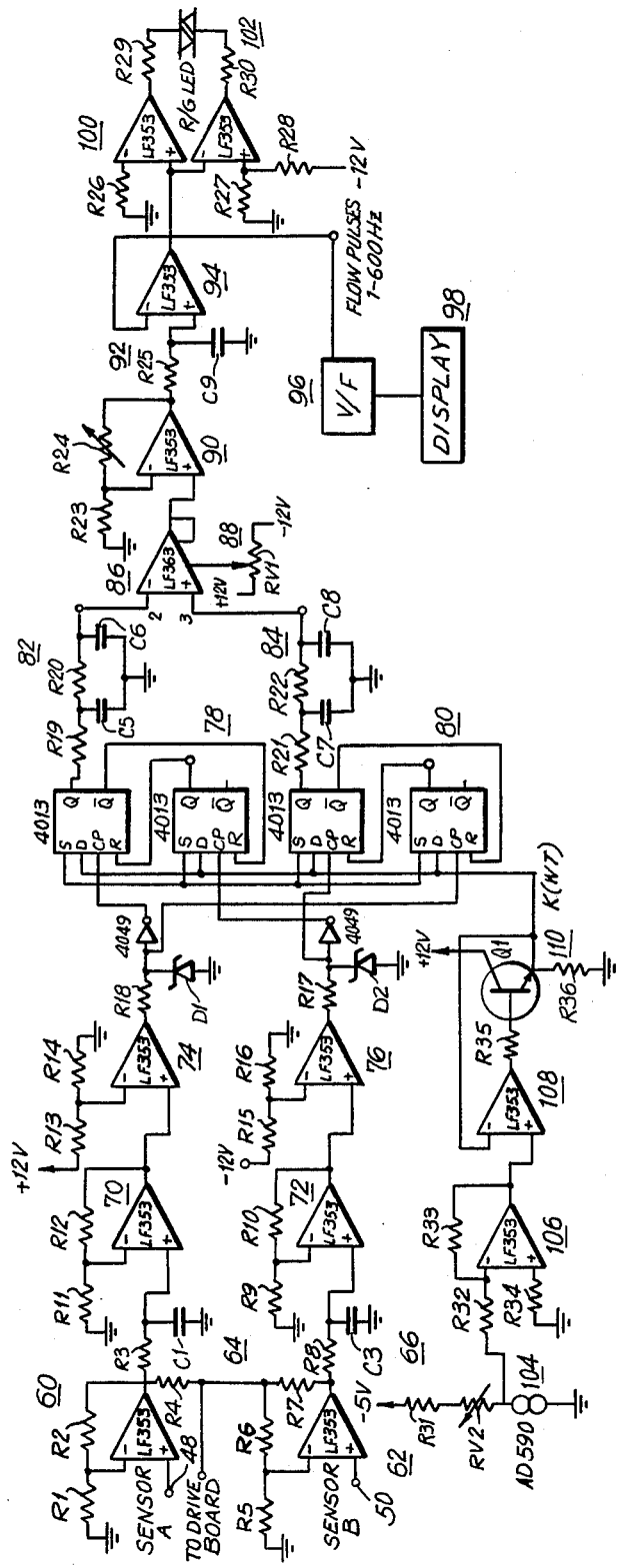
FIG. 8 is a schematic diagram illustrating a circuit used to deduce mass flow rate.

Referring to FIGS. 8-10 for an illustration of a technique for deducing mass flow rate through conduits 10 and 10a from the outputs of sensors 48 and 50, the output of each sensor when the conduits are oscillated is an AC waveform substantially at the driving frequency, which in turn corresponds to the system's natural frequency of vibration. The output of senso 48 is fed into input A of an amplifier stage 60, and the output of sensor 50 is fed into input B of a similar amplifier stage 62. Each of stages 60 and 62 can comprise an operational amplifier in the configuration illustrated in FIG. 8, and can provide a gain of about 50 but can be provided with an output level limiter to raise the sensor outputs in peak-to-peak level from about 0.7 volts to about 24 volts. An output labelled "To Drive Board" energizes coil 46b of driver 46. The outputs of amplifier stages 60 and 62 are filtered at respective filter stages 64 and 66, which drops their peak-to-peak level to about 0.23-0.24 volts, and a gain of about 100 is added at respective amplifier stages 70 and 72, to raise the peak-to-peak voltages to about 24 volts. The outputs of amplifier stages 70 and 72 are waveforms of the general truncated triangular shape illustrated at W1 in FIG. 9. At comparator stages 74 and 76 the respective processed outputs of sensors 48 and 50 (signals A and B, respectively) are squared, using a 12 volt reference voltage dropped to about 7 volts by the illustrated voltage divider network. Note that comparator 74 uses a positive reference voltage while comparator 76 uses a negative reference voltage. The effect of this is illustrated in FIG. 9, which shows at W1 the outputs of amplifier stages 70 and 72. These outputs should be in phase, and should coincide. Any phase offset between them can be zeroed out as described below. Comparator 74 uses the +7 volt nominal reference, and outputs a waveform such as W2 in FIG. 9, while comparator 76 uses the −7 volt nominal reference, and outputs a waveform such as W3. A flip-flop trigger network 78 in effect subtracts waveform W2 from waveform W3, allowing a non-zero output only when waveform W2 rises, to thereby produce as an output a waveform W4. A similar flip-flop trigger network 80 similarly produces a waveform W5, allowing a non-zero output only when waveform W1 falls. Waveforms W4 and W5 are filtered by respective RC networks 82 and 84, to convert them to DC levels for output at pins 2 and 3, respectively.

These DC outputs are input to a differential amplifier stage 86 provided with a zero adjustable resistor-reference voltage network 88 as illustrated. The output of zero adjust amplifier stage 86 goes into a span adjust amplifier stage 90, which has an adjustable gain an whose output is filtered to reduce ripple at RC stage 92, and the filtered output is buffered at stage 94, whose output goes to a voltage-to-frequency converter 96 which drives a display 98 displaying mass flow rate in suitable engineering units, such as in lb/sec or in any other desired units. A twin amplifier stage 100 connected as shown feeds a red/green light 102 used in a zero-adjust procedure. If the two sensors outputs are in phase when there is no flow, the outputs of amplifiers 100 should be balanced and light 102 should be off. If one or the other is higher, the amplifier outputs are not balanced, and balance can be restored by adjusting zero adjust resistor network 88.

As seen in FIGS. 8 and 9, when there is no flow and there is a proper zero adjust, the waveforms W4 and W5 should have the same duty cycle and hence the same DC level, and display 98 should receive a signal indicating no flow and light 102 should be off. When fluid flows through conduits 10 and 10a, the phase difference between waveforms A and B (and W2) and W3 changes, as illustrated in FIG. 10. Now the duty cycle of waveforms W4 and W5 is no longer the same, and their DC levels differ from each other. This change in phase difference from the zeroed state is believed to be proportional to mass flow rate through conduits 10 and 10a. Differential amplifier stage 86 measures this change in phase difference and outputs a proportional DC level. Hence, display 98 should receive a signal indicative of a mass flow rate as determined by the sensor signals processed as discussed by the circuits illustrated in FIG. 8. If the flow is in the correct direction, and the electrical leads have been properly connected, light 102 should be green.

The components shown in FIG. 8 can have the following values:

| | | |
|---|---|---|
| R1 = 10 Kohm | R13 = 15 Kohm | R25 = 200 Kohm |
| R2 = 470 Kohm | R14 = 20 Kohm | R26 = 47 Kohm |
| R3 = 100 Kohm | R15 = 15 Kohm | R27 = 1.5 Kohm |
| R4 = 47 Kohm | R16 = 20 Kohm | R28 = 4.7 Mohm |
| R5 = 10 Kohm | R17 = 10 Kohm | R29 = 1 Kohm |
| R6 = 470 Kohm | R18 = 10 Kohm | R30 = 1 Kohm |
| R7 = 47 Kohm | R19 = 200 Kohm | R31 = 1.5 Kohm |
| R8 = 100 Kohm | R20 = 200 Kohm | R32 = 200 Kohm |
| R9 = 10 Kohm | R21 = 200 Kohm | R33 = 150 Kohm |
| R10 = 1 Mohm | R22 = 200 Kohm | R34 = 100 Kohm |
| R11 = 10 Kohm | R23 = 10 Kohm | R35 = 390 ohm |
| R12 = 1 Mohm | R24 = 100 Kohm | R36 = 1.5 Kohm |
| C1 = .47 uF | | RV1 = 1 Kohm |
| C3 = .47 uF | | RV2 = 1 Kohm |
| C5 = 1.0 uf | | |
| C6 = 1.0 uF | | |
| C7 = 1.0 uF | | |
| C8 = 1.0 uF | | |
| C9 = 1.0 uf | | |

A temperature sensor 104 (FIG. 8) is coupled with one or both conduits to measure the conduit temperature. The resulting signal is amplified as shown at 106 and 108, and drives transistor 110 whose output is supplied as indicated to networks 78 and 80 to compensate for temperature variations.

The exemplary dimensions for the 0.5 inch OD tube discussed above can be scaled to other sizes, for example in accordance with this scale factor:

$$[2.299 (D_o^4 D - i^4) / (D_o^2 - D_i^2)]^{\frac{1}{4}}$$

where $D_o$ and $D_i$ are, respectively, outside and inside diameter of the new conduit and this scale factor is used to scale the dimensions given for the old, 0.5 inch OD, 0.035 inch wall thickness, steel conduit shown in FIG. 1a.

We claim:

1. A Coriolis-type mass flow meter comprising:
a pair of omega-shaped, continuous and continuously curved conduits for fluid flow which, when at rest, lie in two substantially parallel planes and are aligned with each other, wherein each conduit comprises, in sequence along the fluid flow therethrough (1) a substantially straight inlet section having an inlet end and extending therefrom in a first direction, (2) a first bent section which bends counterclockwise and ends in a second direction which is substantially opposite to the first direction, (3) a first intermediate section extending in the second direction, (4) a second bent section which bends clockwise and ends substantially in the first direction, (5) a middle section extending generally in the first direction, (6) a third bent section which bends clockwise and ends substantially in the second direction, (7) a second intermediate section extending substantially in the second direction (8) a fourth bent section which bends counterclockwise and ends substantially in the first direction, and (9) a substantially straight outlet section extending substantially in the first direction and terminating in an outlet end;
an inlet support supporting the inlet end of the inlet section and an outlet support supporting the outlet end of the outlet section of each of said conduits, wherein the inlet and outlet supports face each other and support the conduits as restrained beams;
a driver which alternately pushes the central portions of the middle sections of the conduits apart and pulls them together at a driving frequency to thereby oscillate each conduit about a respective oscillation axis which is substantially concentric with the inlet and outlet sections thereof;
sensors secured to the conduits to produce outputs related to the relative movement between the conduits about respective response axis each of which is substantially perpendicular to the conduit's oscillation axis and substantially bisects the conduit's middle section; and
a circuit responsive to changes in phase difference between the sensor outputs to produce a signal indicative of mass flow rate through the conduits.

2. A Coriolis-type mass flow meter comprising:
a pair of omega-shaped, continuous conduits for fluid flow which, when at rest, lie in two substantially parallel planes and are aligned with each other, wherein each conduit comprises, in sequence along the flow, an inlet section which extends generally to the right in a selected view, a first bend of about 180 degrees up from the inlet section, a first intermediate section which extends generally to the left, a second bend of about 180 degrees up from the first intermediate section, a middle section which extends generally to the right, a third bend of about 180 degrees down from the middle section, a second intermediate section which extends generally to the left and is substantially coaxial with the first intermediate section, a fourth bend of about 180 degrees down from the second intermediate section, and an outlet section which extends generally to the right and is substantially coaxial with the inlet section;
wherein the conduits are symmetrical with respect to a plane bisecting the middle sections;
an inlet support which supports the inlet sections of said conduits in a plane which intersects said first intermediate sections and an outlet support which supports the outlet sections of said conduits in a plane which intersects said second intermediate sections; and
a driver which oscillates each conduit about an oscillation axis thereof while fluid flows through the conduits, and a detector which measures effects of the fluid flow on motion of each conduit about a response axis thereof and determines therefrom the mass flow rate through the conduits.

3. A twin conduit Coriolis-type mass flow meter in which each conduit has at least two flow reversing bends which have opposite angular directions and each of at least two of the flow reversing bends in each conduit changes the direction of flow through the conduit from a first direction to a second direction which is substantially opposite to said first direction, said meter comprising:
- a first continuous conduit which has inlet and outlet portions which are substantially coaxial with an oscillation axis and a middle portion which is offset from the oscillation axis and is transverse to a response axis;
- a second conduit which is substantially the same as the first conduit and is substantially parallel to and aligned therewith and has respective oscillation and response axes;
- wherein each conduit has at least two flow reversing bends which have opposite angular directions and the bends of a conduit are free of torque beams and each of at least two of the flow reversing bends in each conduit changes the direction of flow through the conduit from a first direction to a second direction which is substantially opposite to said first direction;
- a drive which oscillates the conduits relative to each other about their respective oscillation axes to cause a relative Coriolis-type response of the conduits about the response axes when fluid flows through the conduits; and
- a circuit responsive to said relative Coriolis-type response to provide an indication of mass flow rate through the conduits.

4. A meter as in claim 3 in which each conduit has at least three flow reversing bends.

5. A meter as in claim 4 in which each conduit has at least four flow reversing bends which successively change the direction of flow in alternating directions.

6. A meter as in claim 5 in which in each conduit two of said bends are in one angular direction and two of said bends are in an opposite angular direction.

7. A meter as in claim 6 in which each of said conduits is substantially round and the radius of each bend is at least twice the diameter of the conduit.

8. A meter as in claim 7 in which the radius of each bend in each conduit is no more than three times the diameter of the conduit.

9. A meter as in claim 8 in which each of said conduits is oscillated about its respective oscillation axis in a drive mode and responds about its respective response axis in a response mode, and wherein the ratio of resonant frequency in the response mode to resonant frequency in the drive mode in each of said conduits is in the range of about 1.4 to about 1.6.

10. A meter as in claim 9 in which said ratio of resonant frequencies is about 1.5 in each conduit.

11. A meter as in claim 10 in which the each of the inlet and outlet of each of the conduits is loaded in torsion due to the oscillation of the conduits about their respective oscillation axes.

12. A meter as in claim 11 in which the each of the inlet and outlet of each of the conduits is loaded in bending due to the response of the conduits about their respective response axes.

13. A meter as in claim 12 including an inlet support to which the inlets of the conduits are joined by respective rigid inlet joints and an outlet support which is spaced from and faces the inlet support and to which the outlets of the conduits are joined by respective rigid outlet joints.

14. A meter as in claim 13 including a mounting structure for mounting the conduits either in (i) a liquid flow mode in which the inlets and outlets of the conduits are horizontal while portions of the conduits which are between the inlets and outlets thereof are entirely above the inlets and outlets or (ii) in a gas flow mode in which the inlets and outlets are horizontal while the portions of the conduits which are between the inlets and outlets thereof are entirely below the inlets and outlets, to thereby reduce adverse effects due to gas bubbles in a liquid flow and condensation in a gas flow.

15. A meter as in claim 3 in which each conduit has at least three flow reversing bends.

16. A meter as in claim 15 in which each conduit has at least four flow reversing bends.

17. A meter as in claim 16 in which each conduit two of said bends are in one angular direction and two of said bends are in an opposite angular direction.

18. A meter as in claim 3 including an inlet support to which the inlet of each conduit is joined by a respective rigid inlet joint and an outlet support which is spaced from and faces the inlet support and to which the outlet of each conduit is joined by a respective rigid outlet joint, wherein said joints are loaded in torsion due to the oscillation of the conduits about the oscillation axes and in bending due to the response of the conduit about the response axes.

19. A meter as in claim 3 including a mounting structure for mounting the conduits with the inlet and outlet of each conduit being horizontal and with the remainder of the conduits being either (i) entirely above the inlets and outlets for liquid flow through the conduits or (ii) entirely below the inlets and outlets for gas flow through the conduits, to thereby reduce adverse effects due to gas bubbles in a liquid flow and condensation in a gas flow.

20. A twin conduit Coriolis-type mass flow meter comprising:
- a first continuous conduit which has inlet and outlet portions which are substantially coaxial with an oscillation axis and a middle portion which is offset from the oscillation axis and is transverse to a response axis, wherein said first conduit has at least two semicircular bends in opposite angular directions;
- a second conduit which is substantially the same as the first conduit and is substantially parallel to and aligned therewith and has respective oscillation and response axes;
- a drive which oscillates the conduits relative to each other about their respective oscillation axes to cause a relative Coriolis-type response of the conduits about the response axes when fluid flows through the conduits; and
- a circuit responsive to said relative Coriolis-type response to provide an indication of mass flow rate through the conduits
- in which the conduits are oscillated about their respective oscillation axes in a drive mode and respond about their respective response axes in a response mode, and wherein the ratio of resonant frequency in the response mode to resonant frequency in the drive mode is in the range of about 1.4 to about 1.6.

21. A meter comprising:
- a first continuous conduit which has an inlet and outlet portions which are substantially coaxial with an oscillation axis and a middle portion which is offset from the oscillation axis and is transverse to a response axis;

a second conduit which is substantially the same as the first conduit and is substantially parallel to and aligned therewith and has respective oscillation and response axes;

a drive which oscillates the conduits relative to each other about their respective oscillation axes to cause a relative Coriolis-type response of the conduits about the response axes when fluid flows through the conduits; and a circuit responsive to said relative Coriolis-type response to provide an indication of mass flow rate through the conduits;

in which the conduits are oscillated about their respective oscillation axes in a drive mode and respond about their respective response axes in a response mode, and wherein the ratio of resonant frequency in the response mode to resonant frequency in the drive mode is about 1.5.

22. A Coriolis-type mass flow meter comprising:

a first continuous conduit which has inlet and outlet portions which are substantially coaxial with an oscillation axis and a middle portion which is offset from the oscillation axis and is transverse to a response axis;

a second conduit which is substantially the same as the first conduit and is substantially parallel to and aligned therewith and has respective oscillation and response axes;

a drive which oscillates the conduits relative to each other about their respective oscillation axes to cause a relative Coriolis-type response of the conduits about the response axes when fluid flows through the conduits; and a circuit responsive to said relative Coriolis-type response to provide an indication of mass flow rate through the conduits;

in which each conduit has a substantially constant diameter and at least one flow reversing bend, wherein the radius of each bend is in the range of about two to three times the conduit diameter.

23. A meter comprising at least one continuous conduit having an inlet, an outlet, and an intermediate portion which is offset from the inlet and outlet, wherein said at least one conduit has at least two flow reversing bends which are in opposite angular directions and each of which changes the flow direction by approximately 180 degrees, a drive for oscillating the intermediate portion in a drive mode oscillation about an oscillation axis in the presence of fluid flow through the conduit to cause a response mode oscillation of said intermediate portion about a response axis, the ratio of resonant frequency for said response mode oscillation to resonant frequency in said drive mode oscillation being in the range of about 1.4 to about 1.6, and a circuit coupled to the conduit to provide an indication of mass flow rate of said fluid as a function of selected parameters of said response mode oscillation.

24. A meter as in claim 23 in which the inlet and outlet of said at least one conduit comprise respective substantially straight conduit portions which are substantially coaxial with said oscillation axis.

25. A meter as in claim 24 in which said at least one conduit has more than two flow reversing bends.

26. A meter as in claim 24 in which said at least one conduit has at least four flow reversing bends.

27. A meter as in claim 24 in which said at least one conduit has at least two flow reversing bends in one angular direction and at least two flow reversing bends in an opposite angular direction.

28. A meter as in claim 27 in which said at least one conduit has only four flow reversing bends.

29. A meter as in claim 23 including two substantially identical conduits which are spaced from each other and substantially conform to two parallel planes and are substantially aligned with each other, wherein the drive oscillates the two conduits relative to each other about respective oscillation axes and the conduits respond about respective response axes.

30. A meter as in claim 23 including an inlet support to which the inlet of said at least one conduit is joined by a rigid inlet joint and an outlet support which is spaced from and faces the inlet support and to which the outlet of said at least one conduit is joined by a rigid outlet joint, wherein said joints are loaded in torsion due to the oscillation of the conduit about the oscillation axis and in bending due to the response of the conduit about the response axis.

31. A twin conduit meter comprising two substantially identical, continuous conduits each of which has an inlet, an outlet and an intermediate portion offset from the inlet and outlet, and an inlet support to which the inlet of each conduit is joined by a rigid inlet joint and an outlet support which is spaced from and faces the inlet support and to which the outlet of each conduit is joined by a rigid outlet joint, each conduit further having an oscillation axis about which the intermediate portion thereof can oscillate relative to the inlet and outlet thereof and a response axis about which the intermediate section thereof responds when oscillated about the oscillation axis in the presence of fluid flow through the conduit, wherein said joints are loaded in torsion due to the oscillation of each conduit about the oscillation axis thereof and in bending due to the response of each conduit about the response axis thereof, and the oscillation axis of each conduit does not pass through the intermediate portion thereof and each conduit substantially conforms to a single plane, wherein the two conduits are rigidly braced to each other at points intermediate their inlets and intermediate portions and at points intermediate their intermediate portions and their outlets, and wherein each conduit has at least two substantially semicircular bends changing the direction of flow in different angular directions and the bends are free of torque beams.

32. A meter as in claim 31 in which each of said conduits has more than two flow reversing bends.

33. A twin conduit meter comprising two substantially identical, continuous conduits each of which has an inlet, an outlet and an intermediate portion offset from the inlet and outlet, and an inlet support to which the inlet of each conduit is joined by a rigid inlet joint and an outlet support which is spaced from and faces the inlet support and to which the outlet of each conduit is joined by a rigid outlet joint, each conduit further having an oscillation axis about which the intermediate portion thereof can oscillate relative to the inlet and outlet thereof and a response axis about which the intermediate section thereof responds when oscillated about the oscillation axis in the presence of fluid flow through the conduit, wherein said joints are loaded in torsion due to the oscillation of each conduit about the oscillation axis thereof and in bending due to the response of each conduit about the response axis thereof, and the oscillation axis of each conduit does not pass through the intermediate portion thereof and each conduit substantially conforms to a single plane, wherein the two conduits are rigidly braced to each other at points intermediate their inlets and intermediate portions and at points intermediate their intermediate portions and their outlets, in which each conduit has more than two flow reversing bends, at least two of which are at least semicircular, and are in opposite angular directions, and the ratio of resonant frequency about the response axis to resonant frequency about the oscillation axes of said conduits is in the range of about 1.4–1.6.

34. A meter as in claim 33 in which the inlet and outlet of each of said conduits are substantially coaxial with the oscillation axis thereof.

35. A meter as in claim 34 including a circuit responsive to the response of the conduits about the response axes thereof to provide an indication of the mass flow rate of fluid which flows through the conduits during said oscillation thereof.

36. A meter as in claim 35 in which said circuit is responsive to the relative response to said oscillation about said respective response axes as between the two conduits.

* * * * *